United States Patent
Brown et al.

(10) Patent No.: US 10,168,207 B2
(45) Date of Patent: Jan. 1, 2019

(54) SUNSCREEN EFFECTIVENESS MONITORING

(71) Applicant: International Business Machines Corporation, Armonk, NY (US)

(72) Inventors: Michael S. Brown, Wahroonga (AU); James D. Cleaver, Grose Wold (AU); Louise A. McGuire, Beaumont Hills (AU); Michael J. McGuire, Beaumont Hills (AU)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/170,206

(22) Filed: Jun. 1, 2016

(65) Prior Publication Data
US 2017/0350754 A1    Dec. 7, 2017

(51) Int. Cl.
*G01J 1/42*    (2006.01)
*G08B 21/04*    (2006.01)
(Continued)

(52) U.S. Cl.
CPC .............. *G01J 1/429* (2013.01); *G01J 1/4228* (2013.01); *G08B 3/10* (2013.01); *G08B 5/38* (2013.01);
(Continued)

(58) Field of Classification Search
CPC ....................................................... G01J 1/429
See application file for complete search history.

(56) References Cited

U.S. PATENT DOCUMENTS

| 3,710,115 A | 1/1973 | Jubb |
| 5,581,090 A * | 12/1996 | Goudjil ..................... G01J 1/50 250/372 |

(Continued)

FOREIGN PATENT DOCUMENTS

WO    20140135871 A2    9/2014

OTHER PUBLICATIONS

Atherton, "StormTag—A Bluetooth Weather Station. On Your Keyring.", Kickstarter, Project launched Jun. 10, 2014, 11 pages, <https://www.kickstarter.com/projects/jonatherton/stormtag-a-bluetooth-weather-station-on-your-keyring>.

(Continued)

*Primary Examiner* — David P Porta
*Assistant Examiner* — Jeremy S Valentiner
(74) *Attorney, Agent, or Firm* — Christopher K. McLane; Maeve M. Carpenter

(57) ABSTRACT

In an approach to monitoring sunscreen effectiveness, a computer receives input from a user. The computer receives data corresponding to ultraviolet radiation exposure from a first ultraviolet radiation sensor and a second ultraviolet radiation sensor. The computer determines an amount of ultraviolet radiation received by the first ultraviolet radiation sensor and the second ultraviolet radiation sensor. The computer determines whether the amount of ultraviolet radiation received by the first ultraviolet radiation sensor is similar to the amount of ultraviolet radiation received by the second ultraviolet radiation sensor. The computer determines whether the amount of ultraviolet radiation received by the first ultraviolet radiation sensor is below an alert threshold. In response to determining the amount of ultraviolet radiation received by the first ultraviolet radiation sensor is not below an alert threshold, the computer transmits an alert message to the user.

18 Claims, 6 Drawing Sheets

(51) Int. Cl.
  *G08B 3/10*   (2006.01)
  *G08B 5/38*   (2006.01)
  *G08B 25/08*  (2006.01)

(52) U.S. Cl.
  CPC ......... *G08B 21/0453* (2013.01); *G08B 25/08* (2013.01)

(56) References Cited

U.S. PATENT DOCUMENTS

| | | | | |
|---|---|---|---|---|
| 5,986,273 | A * | 11/1999 | Tripp | G01J 1/50 |
| | | | | 250/474.1 |
| 6,818,904 | B1 | 11/2004 | Ferren et al. | |
| 8,044,363 | B2 | 10/2011 | Ales et al. | |
| 9,851,298 | B1 * | 12/2017 | Isikman | G01N 21/47 |
| 2005/0263710 | A1 * | 12/2005 | Tsou | G01J 1/4228 |
| | | | | 250/372 |
| 2005/0285050 | A1 * | 12/2005 | Bruce | G01J 1/429 |
| | | | | 250/474.1 |
| 2006/0231494 | A1 * | 10/2006 | Lu | B01J 20/205 |
| | | | | 210/656 |
| 2012/0153179 | A1 | 6/2012 | Tew | |
| 2015/0041663 | A1 * | 2/2015 | Oliver | G01J 1/0219 |
| | | | | 250/372 |
| 2015/0102208 | A1 * | 4/2015 | Appelboom | G06F 19/3481 |
| | | | | 250/208.2 |
| 2016/0015273 | A1 * | 1/2016 | Millikan | A61B 5/0077 |
| | | | | 348/77 |
| 2017/0191866 | A1 * | 7/2017 | Balooch | G01J 1/429 |

OTHER PUBLICATIONS

Coxworth, "UV-measuring wrist band lets you know when to reapply sunscreen", Health and Wellbeing, Mar. 7, 2013, 7 pages.

"The crowdsourced weather map", WeatherSignal, printed on Mar. 10, 2016, 1 page, <http://weathersignal.com/>.

"UVeBand", My Website, printed on Mar. 10, 2016, 2 pages, <http://suntimellc.com>.

Mell et al., "The NIST Definition of Cloud Computing", National Institute of Standards and Technology, U.S. Department of Commerce, NIST Special Publication 800-145, Sep. 2011, 7 pages.

* cited by examiner

SUNSCREEN EFFECTIVENESS MONITORING

BACKGROUND OF THE INVENTION

The present invention relates generally to the field of ultraviolet radiation detection, and more particularly to sunscreen effectiveness monitoring.

Ultraviolet (UV) light is electromagnetic radiation with a wavelength from 10 nm to 400 nm, shorter than that of visible light but longer than X-rays. UVA radiation has a wavelength between 315 and 400 nm, while UVB radiation has a wavelength between 280 and 315 nm. While UVB radiation is mostly absorbed by the earth's ozone layer, UVA radiation is not. All bands of UV radiation damage collagen fibers and accelerate aging of the skin. Both UVA and UVB destroy vitamin A in skin, which may cause further damage. Overexposure to UVB radiation not only can cause sunburn, but also some forms of skin cancer. However, the degree of redness, generally not caused by UVA, does not predict the long-term effects of UV.

Sunscreen is a lotion, spray, gel, or other topical product which absorbs or reflects some of the sun's UV radiation and thus helps protect against sunburn when applied to skin. A sun protection factor (SPF) rating is a measure of the fraction of sunburn-producing UV rays that reach the skin. For example, "SPF 15" means that $\frac{1}{15}$th of the burning radiation will reach the skin, assuming sunscreen is applied evenly at a thick dosage of two milligrams per square centimeter ($mg/cm^2$). A user can determine the effectiveness of a sunscreen by multiplying the SPF factor by the length of time it takes for the user to suffer a burn without sunscreen. Thus, if a person develops a sunburn in ten minutes when not wearing a sunscreen, the same person in the same intensity of sunlight will avoid sunburn for 150 minutes if wearing a sunscreen with an SPF of 15. It is important to note that sunscreens with higher SPF do not last or remain effective on the skin any longer than lower SPF and must be continually reapplied as directed.

SUMMARY

Embodiments of the present invention disclose a method, a computer program product, and an apparatus for monitoring sunscreen effectiveness. The method may include one or more computer processors receiving input from a user. The one or more computer processors receive data corresponding to ultraviolet radiation exposure from a first ultraviolet radiation sensor and a second ultraviolet radiation sensor, wherein the first ultraviolet radiation sensor includes an application of a layer of sunscreen on an exposed surface and wherein the second ultraviolet radiation sensor does not include an application of a layer of sunscreen on an exposed surface. The one or more computer processors determine an amount of ultraviolet radiation received by the first ultraviolet radiation sensor and the second ultraviolet radiation sensor. In response to determining the amount of ultraviolet radiation received by the first ultraviolet radiation sensor is not similar to the amount of ultraviolet radiation received by the second ultraviolet radiation sensor, the one or more computer processors determine whether the amount of ultraviolet radiation received by the first ultraviolet radiation sensor is similar to the amount of ultraviolet radiation received by the second ultraviolet radiation sensor. The one or more computer processors determine whether the amount of ultraviolet radiation received by the first ultraviolet radiation sensor is below an alert threshold. In response to determining the amount of ultraviolet radiation received by the first ultraviolet radiation sensor is not below an alert threshold, the one or more computer processors transmit an alert message to the user.

DETAILED DESCRIPTION

Skin cancer rates due to sun exposure continue to increase, and there is a large focus on prevention. Current sunscreens are effective, but vary in protection (SPF rating) and other attributes, such as dispersion over time or in water, which can limit effectiveness in ways that are not predictable by a user. The limited effectiveness can result in sunburn of a user, even if the user had applied sunscreen earlier in the day. Embodiments of the present invention recognize that overexposure to the sun's UV radiation can be minimized by providing a device which detects both UV radiation and degradation of sunscreen, such that the device can alert a user to reapply sunscreen as needed. Implementation of embodiments of the invention may take a variety of forms, and exemplary implementation details are discussed subsequently with reference to the Figures.

Figure 1:
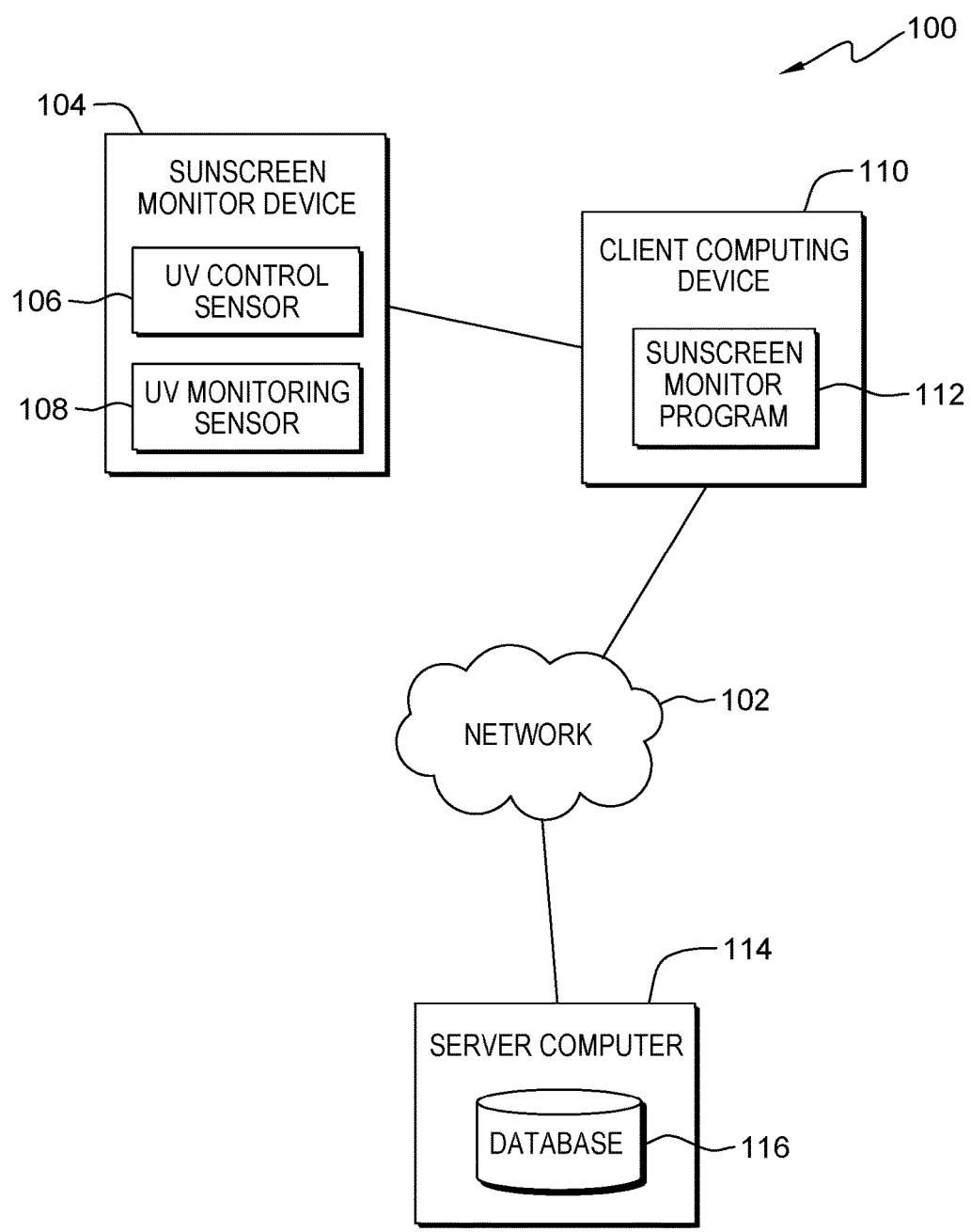
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes sunscreen monitor device 104, client computing device 110, and server computer 114. Client computing device 110 and server computer 114 are interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, server computer 114, and other computing devices (not shown) within distributed data processing environment 100.

Sunscreen monitor device 104 is a wearable computing device which collects data regarding detected UV radiation and communicates the data to client computing device 110. Sunscreen monitor device 104 represents one or more sunscreen monitoring devices within distributed data processing environment 100. Sunscreen monitor device 104 communicates with client computing device 110 using one or more of a plurality of wireless communications protocol, for example, Bluetooth®, NFC (Near Field Communications) protocols, RFID (radio-frequency identification), Wi-Fi®, or cellular communications. Sunscreen monitor device 104 includes a means for the user to attach sunscreen monitor device 104 to a location exposed to sunlight, such as the user's wrist, swimsuit, hat, necklace, etc. In one embodiment, sunscreen monitor device represents any programmable electronic device or combination of programmable electronic devices capable of executing machine readable program instructions and communicating with other computing devices (not shown) within distributed data processing environment 100 via a network, such as network 102. Sunscreen monitor device 104 includes UV control sensor 106 and UV monitoring sensor 108. Sunscreen monitor device 104 is depicted and described in further detail with respect to FIG. 2.

UV control sensor 106 and UV monitoring sensor 108 are each a sensor for detecting UV radiation. A sensor is a device which detects or measures a physical property and then records or otherwise responds to that property, such as vibration, chemicals, radio frequencies, environment, weather, humidity, light, etc. UV sensors output an analog signal in relation to the amount of UV light detected. UV control sensor 106 may include a superhydrophobic coating, i.e., a nanoscopic surface layer which repels water, ensuring that liquids do not impede the sensor function. The superhydrophobic coating is coupled with an exposed surface of UV control sensor 106. Examples of materials used for superhydrophobic coatings include, but are not limited to, a manganese oxide polystyrene (MnO2/PS) nano-composite, a zinc oxide polystyrene (ZnO/PS) nano-composite, a precipitated calcium carbonate, a silica nano-coating, and a carbon nano-tube structure. UV monitoring sensor 108 includes a coating of a substance that resembles human skin, such that the substance behaves in the same way as skin does in response to application of sunscreen. For example, some silicone materials resemble human skin behavior. The coating of the substance that resembles human skin is coupled with an exposed surface of UV monitoring sensor 108. A user covers the coating of UV monitoring sensor 108 with the same sunscreen, and at the same rate and thickness, as the user applies to the user's skin. As environmental factors, such as water or sand, decrease the effectiveness of the sunscreen on the user's skin, the effectiveness of the sunscreen on UV monitoring sensor 108 decreases at the same rate. The difference between the UV radiation detected by UV control sensor 106 and UV monitoring sensor 108 indicates the effectiveness of the sunscreen. In the depicted environment, UV control sensor 106 and UV monitoring sensor 108 reside on sunscreen monitor device 104. In other embodiments, UV control sensor 106 and UV monitoring sensor 108 may reside on other wearable devices known in the art.

Client computing device 110 can be a laptop computer, a tablet computer, a smart phone, or any programmable electronic device capable of communicating with various components and devices within distributed data processing environment 100, via network 102. Client computing device 110 represents one or more client computing devices within distributed data processing environment 100. In general, client computing device 110 represents any programmable electronic device or combination of programmable electronic devices capable of executing machine readable program instructions and communicating with other computing devices (not shown) within distributed data processing environment 100 via a network, such as network 102. In a preferred embodiment, client computing device 110 is a mobile device. Client computing device 110 includes sunscreen monitor program 112.

Sunscreen monitor program 112 is software which helps a user track sunscreen effectiveness and timing of sunscreen reapplication. Sunscreen monitor program 112 can be mobile application software, i.e., an app, which is a computer program typically designed to run on smart phones, tablet computers and other mobile devices. Sunscreen monitor program 112 receives user input to begin a monitoring process. Sunscreen monitor program 112 can also retrieve additional, external input to assist in setting a threshold for the monitoring process. Sunscreen monitor program 112 receives UV data from UV control sensor 106 and UV monitoring sensor 108 and determines the amount of UV radiation the sensors receive. Sunscreen monitor program 112 determines whether the UV radiation received by UV monitoring sensor 108 exceeds a threshold, and if so, then the program transmits a warning or an alert to the user. In the depicted environment, sunscreen monitor program 112 resides on client computing device 110. In another embodiment, sunscreen monitor program 112 may reside on sunscreen monitor device 104. Sunscreen monitor program 112 is depicted and described in further detail with respect to FIG. 3.

Server computer 114 can be a standalone computing device, a management server, a web server, a mobile computing device, or any other electronic device or computing system capable of receiving, sending, and processing data. In other embodiments, server computer 114 can represent a server computing system utilizing multiple computers as a server system, such as in a cloud computing environment. In another embodiment, server computer 114 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 114 represents a computing system utilizing clustered computers and components (e.g., database server computers, application server computers, etc.) that act as a single pool of seamless resources when accessed within distributed data processing environment 100. Server computer 114 includes database 116. In one embodiment, server computer 114 may also include one or more programs or applications that receive data from client computing device 110, as well as a plurality of other client computing devices (not shown) within distributed data processing environment 100, via network 102, and use the data to crowdsource information regarding, for example, UV radiation conditions, sunscreen effectiveness, etc. The one or more programs or applications may also transmit data to client computing device 110, as well as a plurality of other client computing devices within distributed data processing environment 100, via network 102, for use by sunscreen monitor program 112. In one embodiment, one or more of the programs or applications may be a social network application.

Database 116 is a repository for data used by sunscreen monitor program 112. In the depicted embodiment, database 116 resides on server computer 114. In another embodiment, database 116 may reside elsewhere within distributed data processing environment 100 provided sunscreen monitor program 112 has access to database 116. A database is an organized collection of data. Database 116 can be implemented with any type of storage device capable of storing data and configuration files that can be accessed and utilized by server computer 114, such as a database server, a hard disk drive, or a flash memory. Database 116 stores input provided by the user of client computing device 110 regarding personal preferences, sunscreen brand, sunscreen SPF value, etc. Database 116 may also store data uploaded by sunscreen monitor program 112, such as UV conditions provided by UV control sensor 106. Database 116 may also store data from other sources (not shown) in distributed data processing environment 100, such as current weather conditions, areas where UV exposure is high, areas where environmental factors may cause rapid degradation of sunscreen effectiveness, as well as effectiveness of particular brands and SPFs of sunscreens.

Figure 2:
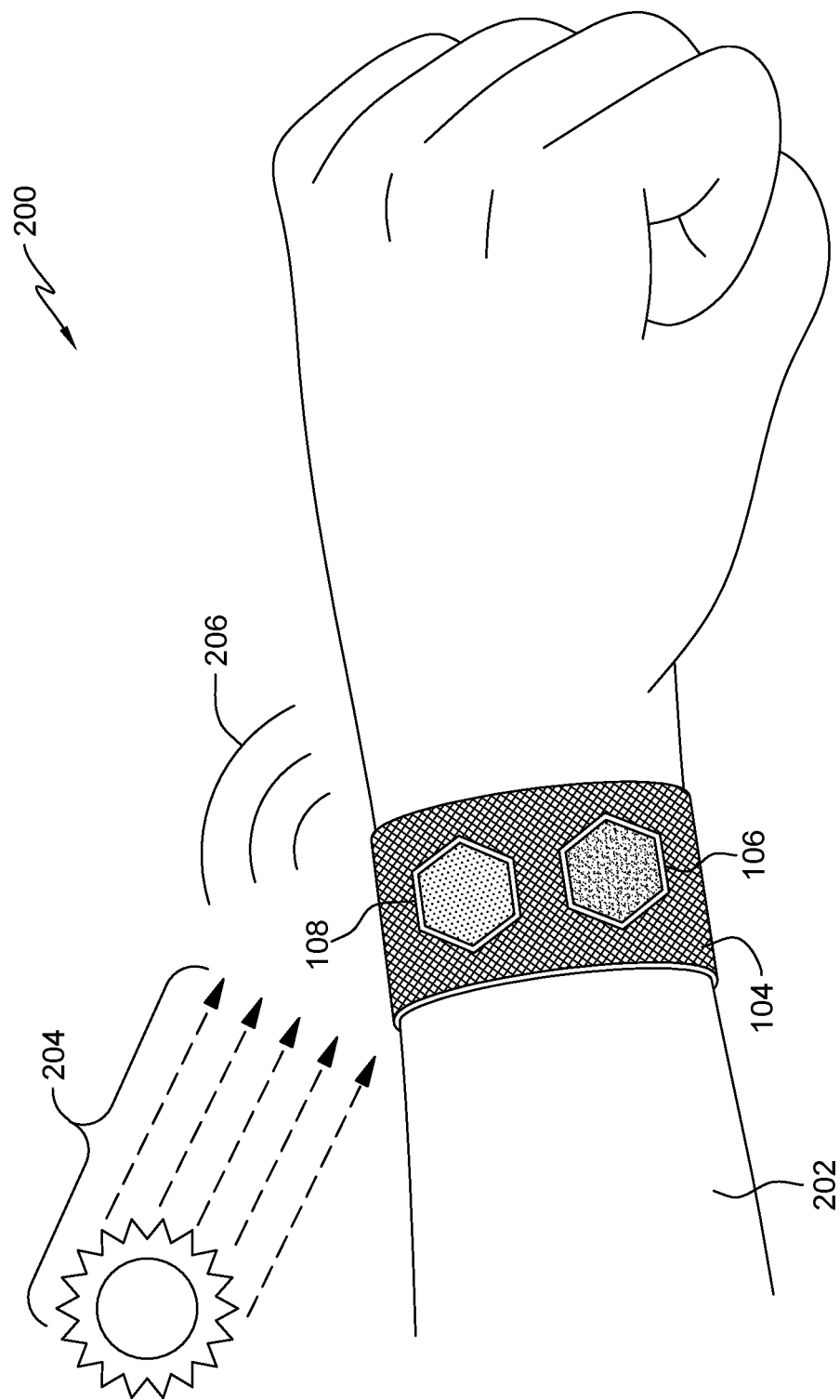
FIG. 2 is an example of an embodiment of a sunscreen monitor device within the distributed data processing environment of FIG. 1, in accordance with an embodiment of the present invention.

FIG. 2 is example 200 of an embodiment of sunscreen monitor device 104 within distributed data processing environment 100 of FIG. 1, in accordance with an embodiment of the present invention.

Example 200 includes user's wrist 202 on which the user wears sunscreen monitor device 104. Sunscreen monitor device 104 includes UV control sensor 106 and UV monitoring sensor 108. As depicted in example 200, UV control sensor 106 and UV monitoring sensor 108 receive UV radiation 204 from the sun and transmit UV data 206 to client computing device 110 (not shown).

Figure 3:
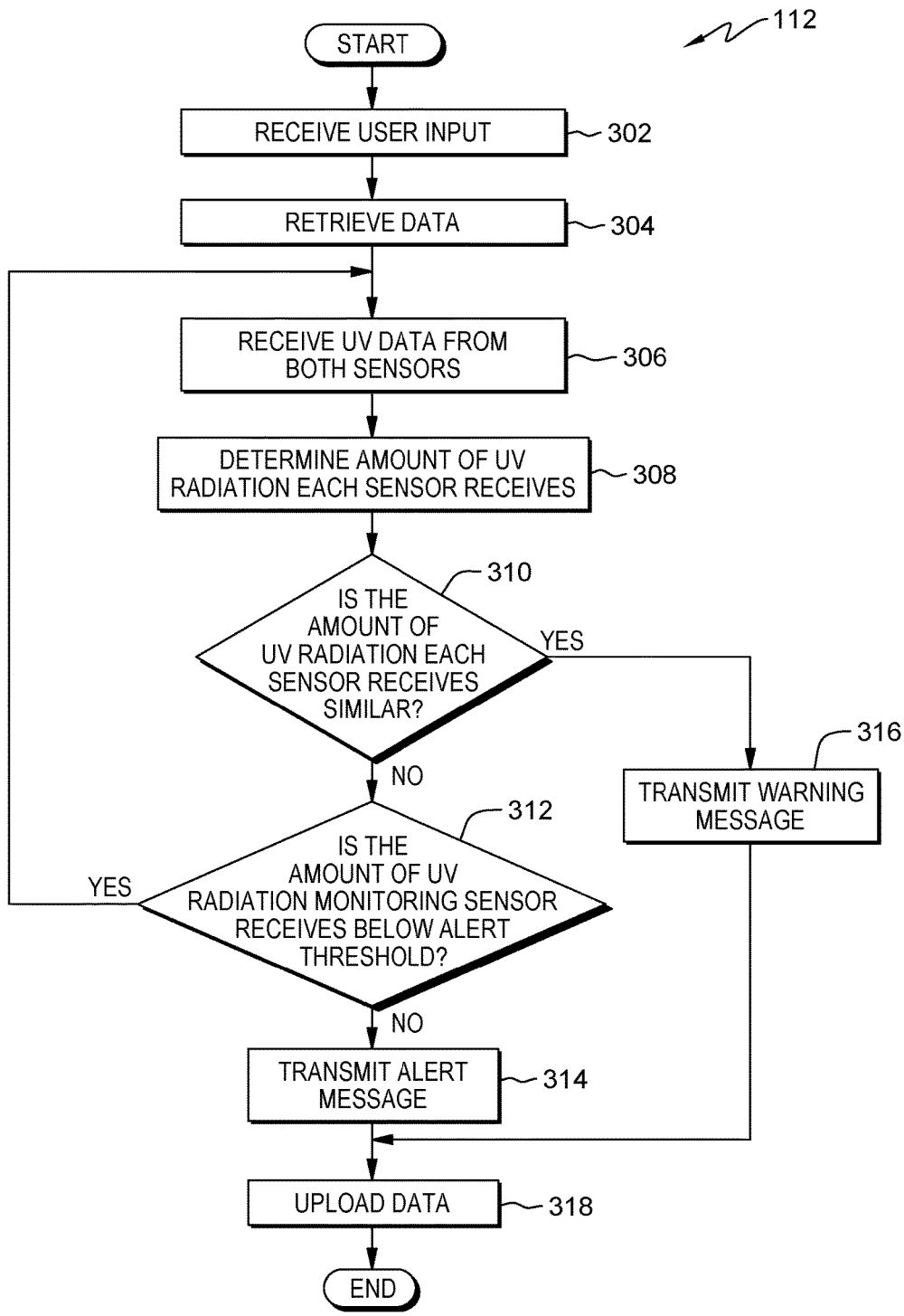
FIG. 3 is a flowchart depicting operational steps of a sunscreen monitor program, on a client computing device within the distributed data processing environment of FIG. 1, for determining sunscreen effectiveness and timing of sunscreen reapplication, in accordance with an embodiment of the present invention.

FIG. 3 is a flowchart depicting operational steps of sunscreen monitor program 112, on client computing device 110 within distributed data processing environment 100 of FIG. 1, for determining sunscreen effectiveness and timing of sunscreen reapplication, in accordance with an embodiment of the present invention.

Sunscreen monitor program 112 receives user input (step 302). Sunscreen monitor program 112 receives one or more of a plurality of user inputs. For example, a user may input a description of the user's skin tone or a level of risk of sun damage associated with the user's skin tone or medical history. In another example, the user may input a specific brand of sunscreen. In a further example, the user may input the SPF of the sunscreen the user has chosen to apply. In one embodiment, sunscreen monitor program 112 may receive user inputs to settings which correspond to a warning or alert message. For example, a user may specify text or sound to include in a warning or alert message. In one embodiment, sunscreen monitor program 112 may prompt the user for inputs by offering a checkbox or dropdown box with questions for the user to answer. For example, sunscreen monitor program 112 may ask the user "Have you applied sunscreen to the UV monitoring sensor?" In one embodiment, user input may include a trigger to start sunscreen monitor device 104 after the user applies sunscreen to UV monitoring sensor 108. For example, the user may trigger a sunscreen monitoring process to begin by pressing a "start button" or switch on either client computing device 110 or sunscreen monitor device 104. In another example, the user may trigger a sunscreen monitoring process to begin by speaking a command to client computing device 110. In a further example, the user may trigger a sunscreen monitoring process to begin by tapping a screen associated with client computing device 110. In one embodiment, sunscreen monitor program 112 saves the user input on database 116 such that the user does not enter various values each time the user initiates sunscreen monitor program 112.

Sunscreen monitor program 112 retrieves data (step 304). In one embodiment, sunscreen monitor program 112 retrieves data from database 116 that one or more of a plurality of users of sunscreen monitor program 112 uploaded to database 116. Uploaded data may include, but is not limited to, current weather conditions, areas where UV exposure level is high, areas where environmental factors may cause rapid degradation of sunscreen effectiveness, as well as effectiveness of particular brands and SPFs of sunscreens. In another embodiment, sunscreen monitor program 112 may retrieve data from other sources, via network 102, such as a government weather database or a social network application, regarding UV exposure conditions. Sunscreen monitor program 112 may use the retrieved data to assist with setting a threshold for a warning or an alert. For example, if the retrieved data indicates that there is heavy cloud cover in a particular location, sunscreen monitor program 112 may change a time restriction included in a sunscreen effectiveness algorithm included in sunscreen monitor program 112. In one embodiment, step 304 may be performed by a separate, standalone module of sunscreen monitor program 112. The separate module may reside on either client computing device 110 or on server computer 114.

Sunscreen monitor program 112 receives UV data from both sensors (step 306). As described with respect to FIGS. 1 and 2, UV control sensor 106 and UV monitoring sensor 108 on sunscreen monitor device 104 collect UV radiation data and transmit the data via one of a plurality of wireless communications protocols to client computing device 110, and sunscreen monitor program 112 receives the UV data. In one embodiment, sunscreen monitor program 112 continually receives UV data from the sensors. In another embodiment, sunscreen monitor program 112 receives UV data periodically, at a regular time interval. In a further embodiment, sunscreen monitor program 112 receives UV data when a user prompts the program to receive UV data. In yet another embodiment, sunscreen monitor program 112 may actively retrieve UV data from the sensors instead of waiting for data transmission from the sensors. In one embodiment, client computing device 110 remains within a pre-defined distance from sunscreen monitor device 104 in order to receive UV data.

Sunscreen monitor program 112 determines the amount of UV radiation each sensor receives (step 308). Sunscreen monitor program 112 collects and tracks the received UV data from both sensors of sunscreen monitor device 104 to determine a quantity of UV radiation to which each sensor is exposed.

Sunscreen monitor program 112 determines whether the amount of UV radiation each sensor receives is similar (decision block 310). Sunscreen monitor program 112 compares the quantity of UV radiation from UV monitoring sensor 108 to UV control sensor 106 to see if the amount of UV radiation is similar, i.e., an amount of radiation one of the sensors received is within a pre-defined threshold of an amount of radiation the other sensor received. A similar amount of UV radiation received by each sensor is an indication that either the sunscreen applied to UV monitoring sensor 108 is not effective at blocking UV radiation or that no sunscreen was applied to UV monitoring sensor 108.

If sunscreen monitor program 112 determines the amount of UV radiation each sensor receives is similar ("yes" branch, decision block 310), then the program transmits a warning message (step 316). In one embodiment, the warning message is text-based message displayed by client computing device 110. For example, the warning message may say "Sunscreen is ineffective. Check UV monitoring sensor for sunscreen application or apply a different sunscreen." In another embodiment, the warning message may be an audible sound emitted by client computing device 110. In a further embodiment, sunscreen monitor program 112 may transmit a warning message by activating a flashing light on client computing device 110. In yet another embodiment, sunscreen monitor program 112 may transmit a warning message by combining one or more of the previously mentioned warning techniques. In an embodiment where sunscreen monitor program 112 transmits a warning message to the user and the user subsequently re-applies sunscreen to UV monitoring sensor 108, sunscreen monitor program 112 can return to step 306 and continue monitoring sunscreen effectiveness for the user.

If sunscreen monitor program 112 determines the amount of UV radiation each sensor receives is not similar ("no" branch, decision block 310), then the program determines whether the amount of UV radiation that UV monitoring sensor 108 receives is below an alert threshold (decision block 312). Sunscreen monitor program 112 includes one or more predefined algorithms, which may be combined with user settings, to detect when a UV radiation threshold is crossed and the user should be alerted. The pre-defined algorithm takes the inputs from the sensors, and from known information about skin type, sensitivity to UV radiation, etc., and then calculates the acceptable level and safety zone for the user.

If sunscreen monitor program 112 determines the amount of UV radiation that UV monitoring sensor 108 receives is below an alert threshold ("yes" branch, decision block 312), then the program returns to step 306 to continue receiving UV data from both sensors.

If sunscreen monitor program 112 determines the amount of UV radiation that UV monitoring sensor 108 receives is not below an alert threshold ("no" branch, decision block 312), then the program transmits an alert message (step 314). An alert message differs from a warning message in that an alert message signals to the user that sunburn, or other UV radiation-induced damage, is imminent if the user does not take action. Similar to a warning message, in one embodiment, sunscreen monitor program 112, may transmit the alert message as a text-based message displayed by client computing device 110. For example, sunscreen monitor program 112 may transmit an alert message such as "Move to shade or apply more sunscreen as soon as possible!" In another embodiment, sunscreen monitor program 112 may transmit the alert message as an audible sound emitted by client computing device 110. In a further embodiment, sunscreen monitor program 112 may transmit an alert message by activating a flashing light on client computing device 110. In yet another embodiment, sunscreen monitor program 112 may transmit an alert message by combining one or more of the previously mentioned alert techniques. In an embodiment where sunscreen monitor program 112 transmits an alert message to the user and the user subsequently re-applies sunscreen to UV monitoring sensor 108, sunscreen monitor program 112 can return to step 306 and continue monitoring sunscreen effectiveness for the user.

Sunscreen monitor program 112 uploads data (step 318). At various times during the UV radiation monitoring process, sunscreen monitor program 112 uploads data to database 116 on server computer 114 or to one or more additional computing devices connected to client computing device 110 via network 102 (not shown). Sunscreen monitor program 112 may upload data similar to data retrieved in step 304. For example, sunscreen monitor program 112 may upload the UV radiation data collected by UV control sensor 106 such that other users can evaluate the UV conditions in the location of sunscreen monitor device 104. In another example, sunscreen monitor program 112 may upload data corresponding to the effectiveness of the particular brand of sunscreen the user applied, which may be, in turn, retrieved by a sunscreen manufacturing entity for market research and further product development. Data uploaded by sunscreen monitor program 112 may be combined with data from one or more other users of a sunscreen monitor device 104 to create a map of current UV radiation conditions in a geographic area around the user which sunscreen monitor program 112 can subsequently retrieve in step 304. In one embodiment, step 318 may be performed by a separate, standalone module of sunscreen monitor program 112. The separate module may reside on either client computing device 110 or on server computer 114.

Figure 4:
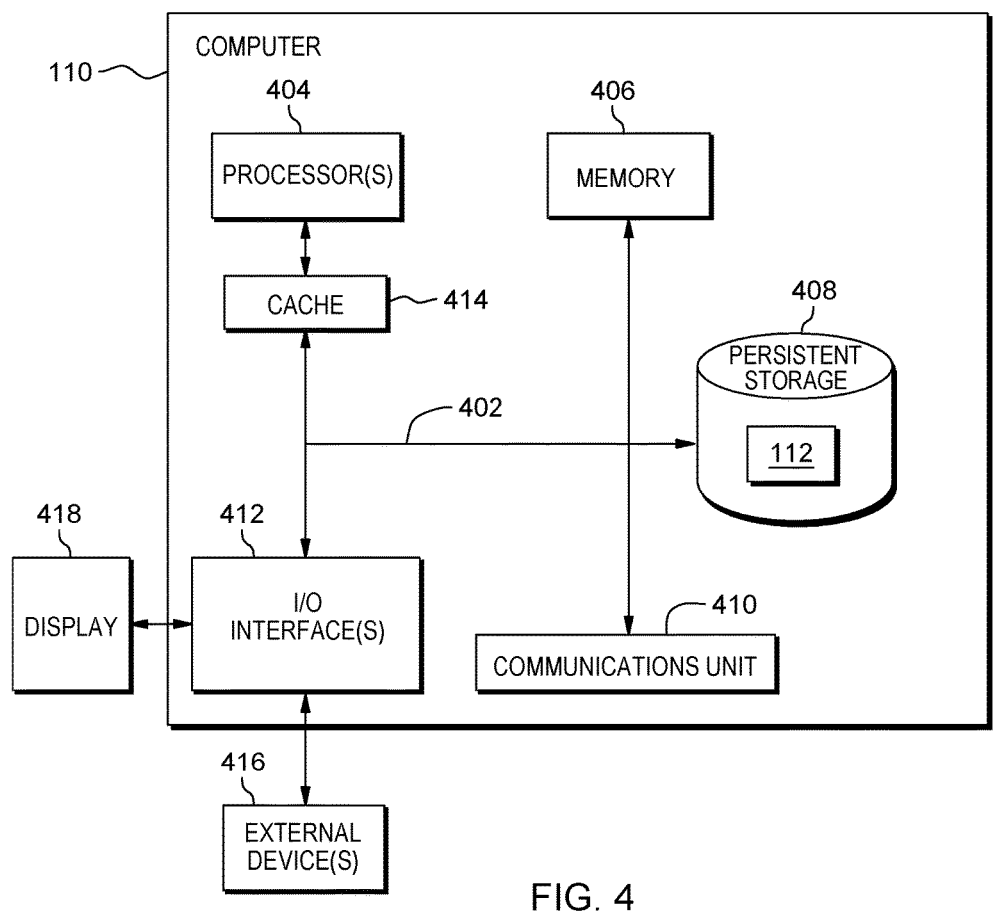
FIG. 4 depicts a block diagram of components of the client computing device executing the sunscreen monitor program within the distributed data processing environment of FIG. 1, in accordance with an embodiment of the present invention.

FIG. 4 depicts a block diagram of components of client computing device 110 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 110 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., sunscreen monitor program 112, can be stored in persistent storage 408 for execution by one or more of the respective processor(s) 404 of client computing device 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of sunscreen monitor device 104 and server computer 114. In these examples, communications unit 410 includes one or more network interface cards. Communications unit 410 may provide communications through the use of either or both physical and wireless communications links. Sunscreen monitor program 112 may be downloaded to persistent storage 408 of client computing device 110 through communications unit 410.

I/O interface(s) 412 allows for input and output of data with other devices that may be connected to client computing device 110. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., sunscreen monitor program 112 on client computing device 110, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
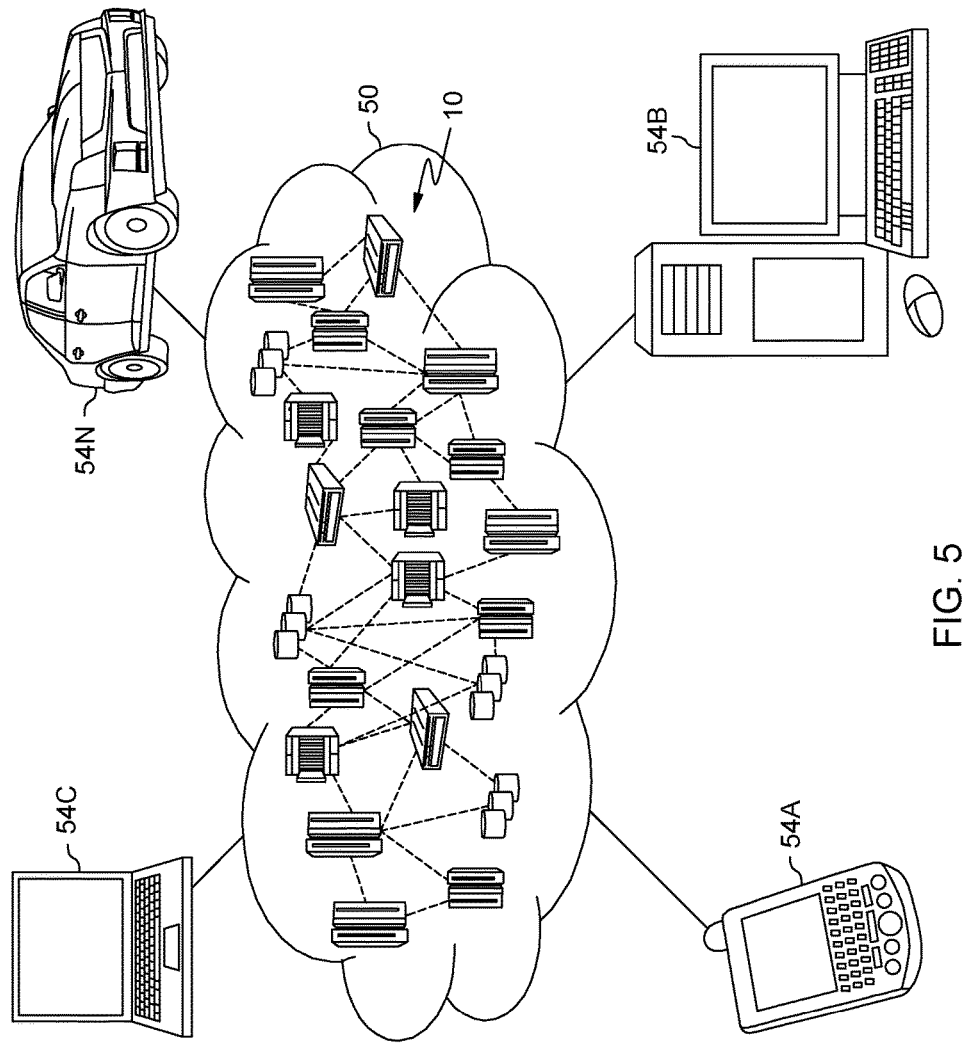
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
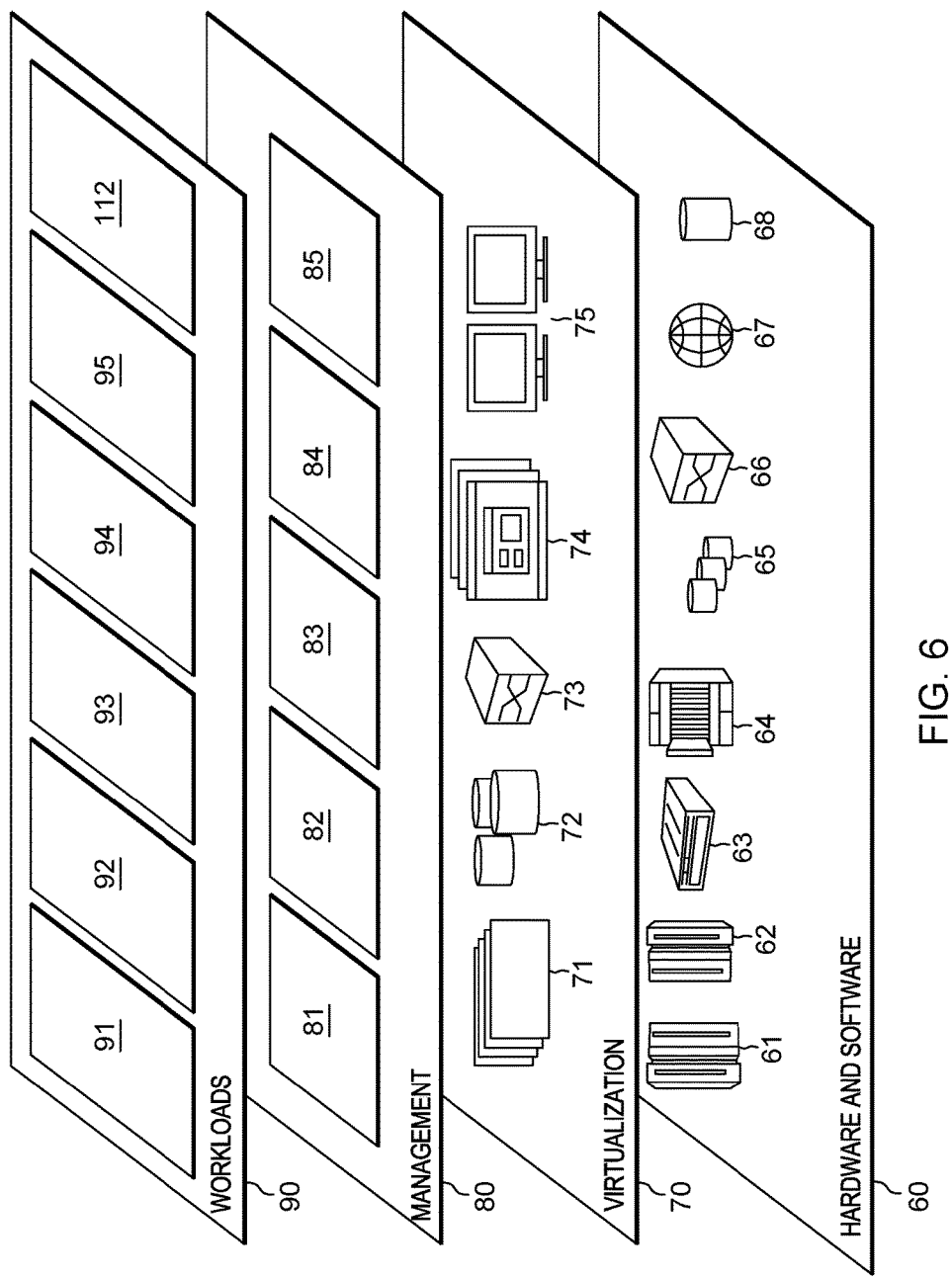
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sunscreen monitor program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring sunscreen effectiveness, the method comprising the steps of:
   receiving, by one or more computer processors, input from a user;
   receiving, by the one or more computer processors, data corresponding to ultraviolet radiation exposure from a first ultraviolet radiation sensor and a second ultraviolet radiation sensor, wherein the first ultraviolet radiation sensor is covered with a thickness of a sunscreen wherein the thickness corresponds to a thickness of the sunscreen applied to skin of the user, and wherein the second ultraviolet radiation sensor is not covered with the thickness of the sunscreen, and wherein the sunscreen is a topical product which absorbs or reflects ultraviolet radiation from the sun;
   determining, by the one or more computer processors, an amount of ultraviolet radiation received by the first ultraviolet radiation sensor and the second ultraviolet radiation sensor;
   determining, by the one or more computer processors, whether the amount of ultraviolet radiation received by the first ultraviolet radiation sensor is similar to the amount of ultraviolet radiation received by the second ultraviolet radiation sensor;
   responsive to determining the amount of ultraviolet radiation received by the first ultraviolet radiation sensor is not similar to the amount of ultraviolet radiation received by the second ultraviolet radiation sensor, determining, by the one or more computer processors, whether the amount of ultraviolet radiation received by the first ultraviolet radiation sensor is below an alert threshold; and
   responsive to determining the amount of ultraviolet radiation received by the first ultraviolet radiation sensor is not below the alert threshold, transmitting, by the one or more computer processors, an alert message to the user.

2. The method of claim 1, further comprising the step of, responsive to determining the amount of ultraviolet radiation received by the first ultraviolet radiation sensor is similar to the amount of ultraviolet radiation received by the second ultraviolet radiation sensor, transmitting, by the one or more computer processors, a warning message to the user.

3. The method of claim 1, further comprising the step of retrieving, by the one or more computer processors, data to assist with setting at least one threshold for a message to the user.

4. The method of claim 3, wherein data to assist with setting at least one threshold for a message to the user includes at least one of: a current weather condition, one or more areas where a UV exposure level is high, one or more areas where at least one environmental factor may cause rapid degradation of sunscreen effectiveness, an effectiveness of a sunscreen brand, a sun protection factor of a sunscreen, and a UV exposure condition.

5. The method of claim 1, further comprising the step of uploading, by the one or more computer processors, data corresponding to one or more of: an amount of ultraviolet radiation received by the first ultraviolet radiation sensor, an amount of ultraviolet radiation received by the second ultraviolet radiation sensor, a received user input, a sunscreen effectiveness, a weather condition, and an environmental factor.

6. The method of claim 1, wherein input from the user includes at least one of: a description of the user's skin tone, a level of risk of sun damage associated with the user's skin tone, a medical history of the user, a brand of sunscreen, a sun protection factor (SPF) of a sunscreen, one or more settings which correspond to a threshold for a warning or an alert message, or a trigger to start a sunscreen monitor device.

7. The method of claim 1 wherein determining whether the amount of ultraviolet radiation received by the first ultraviolet radiation sensor is similar to the amount of ultraviolet radiation received by the second ultraviolet radiation sensor further comprises the steps of:
    comparing, by the one or more computer processors, the amount of ultraviolet radiation received by the first ultraviolet radiation sensor to the amount of ultraviolet radiation received by the second ultraviolet radiation sensor; and
    determining, by the one or more computer processors, the amount of ultraviolet radiation received by the first ultraviolet radiation sensor is within a pre-defined threshold of the amount of ultraviolet radiation received by the second ultraviolet radiation sensor.

8. A computer program product for monitoring sunscreen effectiveness, the computer program product comprising:
    one or more computer readable storage devices and program instructions stored on the one or more computer readable storage devices, the stored program instructions comprising:
    program instructions to receive input from a user;
    program instructions to receive data corresponding to ultraviolet radiation exposure from a first ultraviolet radiation sensor and a second ultraviolet radiation sensor, wherein the first ultraviolet radiation sensor is covered with a thickness of a sunscreen wherein the thickness corresponds to a thickness of the sunscreen applied to skin of the user, and wherein the second ultraviolet radiation sensor is not covered with the thickness of the sunscreen, and wherein the sunscreen is a topical product which absorbs or reflects ultraviolet radiation from the sun;
    program instructions to determine an amount of ultraviolet radiation received by the first ultraviolet radiation sensor and the second ultraviolet radiation sensor;
    program instructions to determine whether the amount of ultraviolet radiation received by the first ultraviolet radiation sensor is similar to the amount of ultraviolet radiation received by the second ultraviolet radiation sensor;
    responsive to determining the amount of ultraviolet radiation received by the first ultraviolet radiation sensor is not similar to the amount of ultraviolet radiation received by the second ultraviolet radiation sensor, program instructions to determine whether the amount of ultraviolet radiation received by the first ultraviolet radiation sensor is below an alert threshold; and
    responsive to determining the amount of ultraviolet radiation received by the first ultraviolet radiation sensor is not below the alert threshold, program instructions to transmit an alert message to the user.

9. The computer program product of claim 8, the stored program instructions further comprising, responsive to determining the amount of ultraviolet radiation received by the first ultraviolet radiation sensor is similar to the amount of ultraviolet radiation received by the second ultraviolet radiation sensor, program instructions to transmit a warning message to the user.

10. The computer program product of claim 8, the stored program instructions further comprising program instructions to retrieve data to assist with setting at least one threshold for a message to the user.

11. The computer program product of claim 10, wherein data to assist with setting at least one threshold for a message to the user includes at least one of: a current weather condition, one or more areas where a UV exposure level is high, one or more areas where at least one environmental factor may cause rapid degradation of sunscreen effectiveness, an effectiveness of a sunscreen brand, a sun protection factor of a sunscreen, and a UV exposure condition.

12. The computer program product of claim 8, the stored program instructions further comprising program instructions to upload data corresponding to one or more of: an amount of ultraviolet radiation received by the first ultraviolet radiation sensor, an amount of ultraviolet radiation received by the second ultraviolet radiation sensor, a received user input, a sunscreen effectiveness, a weather condition, and an environmental factor.

13. The computer program product of claim 8, wherein input from the user includes at least one of: a description of the user's skin tone, a level of risk of sun damage associated with the user's skin tone, a medical history of the user, a brand of sunscreen, a sun protection factor (SPF) of a sunscreen, one or more settings which correspond to a threshold for a warning or an alert message, or a trigger to start a sunscreen monitor device.

14. The computer program product of claim 8, wherein the program instructions to determine whether the amount of ultraviolet radiation received by the first ultraviolet radiation sensor is similar to the amount of ultraviolet radiation received by the second ultraviolet radiation sensor comprise:
    program instructions to compare the amount of ultraviolet radiation received by the first ultraviolet radiation sensor to the amount of ultraviolet radiation received by the second ultraviolet radiation sensor; and
    program instructions to determine the amount of ultraviolet radiation received by the first ultraviolet radiation sensor is within a pre-defined threshold of the amount of ultraviolet radiation received by the second ultraviolet radiation sensor.

15. An apparatus, the apparatus comprising:
    one or more computer processors;

one or more computer readable storage devices;
two or more ultraviolet radiation sensors;
one or more analog signal generators;
one or more wireless communication devices;
program instructions stored on the one or more computer readable storage devices for execution by at least one of the one or more computer processors, the stored program instructions comprising:
program instructions to receive ultraviolet radiation via each of the two or more ultraviolet radiation sensors, wherein a surface of a first ultraviolet radiation sensor of the two or more ultraviolet radiation sensors that receive ultraviolet radiation is coated with a silicone substance that resembles a behavior of human skin in response to a covering of sunscreen;
program instructions to output one or more analog signals corresponding to the ultraviolet radiation received by the two or more ultraviolet radiation sensors via the one or more analog signal generators; and
program instructions to transmit data corresponding to the one or more analog signals to a first computing device via the one or more wireless communication devices.

16. The apparatus of claim 15, wherein a surface of a second ultraviolet radiation sensor of the two or more ultraviolet radiation sensors that receive ultraviolet radiation is coated with a superhydrophobic material, wherein the superhydrophobic material is a nanoscopic surface layer that repels water.

17. The apparatus of claim 15, the apparatus further comprising a means for a user to attach the apparatus to a location exposed to sunlight.

18. The apparatus of claim 16, wherein the superhydrophobic material is a material selected from the group of a manganese oxide polystyrene (MnO2/PS) nano-composite, a zinc oxide polystyrene (ZnO/PS) nano-composite, a precipitated calcium carbonate, a silica nano-coating, and a carbon nano-tube structure.

* * * * *